US012587672B2

(12) United States Patent
Galpin et al.

(10) Patent No.: US 12,587,672 B2
(45) Date of Patent: Mar. 24, 2026

(54) DECOUPLED MODE INFERENCE AND PREDICTION

(71) Applicant: INTERDIGITAL VC HOLDINGS, INC., Wilmington, DE (US)

(72) Inventors: Franck Galpin, Thorigne-Fouillard (FR); Antoine Robert, Mézières sur Couesnon (FR); Fabrice Urban, Thorigne Fouillard (FR)

(73) Assignee: InterDigital VC Holdings, Inc., Wilmington, DE (US)

( * ) Notice: Subject to any disclaimer, the term of this patent is extended or adjusted under 35 U.S.C. 154(b) by 0 days.

(21) Appl. No.: 18/368,247

(22) Filed: Sep. 14, 2023

(65) Prior Publication Data

US 2024/0007665 A1    Jan. 4, 2024

Related U.S. Application Data

(62) Division of application No. 16/652,813, filed as application No. PCT/US2018/054315 on Oct. 4, 2018, now Pat. No. 11,805,271.

(30) Foreign Application Priority Data

Oct. 5, 2017    (EP) ..................................... 17306332

(51) Int. Cl.
  *H04N 19/52*        (2014.01)
  *H04N 19/176*        (2014.01)
  *H04N 19/184*        (2014.01)
(52) U.S. Cl.
  CPC ........... *H04N 19/52* (2014.11); *H04N 19/176* (2014.11); *H04N 19/184* (2014.11)

(58) Field of Classification Search
  CPC .... H04N 19/176; H04N 19/105; H04N 19/70; H04N 19/186; H04N 19/46
  See application file for complete search history.

(56) References Cited

U.S. PATENT DOCUMENTS

| | | | |
|---|---|---|---|
| 8,494,046 B2 | 7/2013 | Yang | |
| 9,083,983 B2 | 7/2015 | Coban et al. | |

(Continued)

FOREIGN PATENT DOCUMENTS

| | | |
|---|---|---|
| CN | 101711480 A | 5/2010 |
| CN | 103843347 A | 6/2014 |

(Continued)

OTHER PUBLICATIONS

Chen et al., "Coding Tools Investigation for Next Generation Video Coding", Qualcomm Incorporated, COM 16-C 806-E, International Telecommunication Union, Telecommunication Standardization Sector, Jan. 2015, pp. 1-7.

(Continued)

*Primary Examiner* — Daniel Chang
(74) *Attorney, Agent, or Firm* — Condo Roccia Koptiw LLP

(57) ABSTRACT

A method of predicting or inferring a piece of information for encoding or decoding uses a predictor from a spatial neighbor, or from a reference picture, instead of predicting or inferring the information, such as a flag for a current block, from a motion predictor block. This procedure can be used in several ways, or used in various motion vector prediction modes, such as Frame Rate Up Conversion or various variations of Advanced Motion Prediction. Other embodiments provide other methods and combinations to derive or infer motion information to increase coding efficiency.

12 Claims, 15 Drawing Sheets

(56)                    References Cited

U.S. PATENT DOCUMENTS

| | | | | |
|---|---|---|---|---|
| 10,110,922 B2 * | 10/2018 | Zhang | | H04N 19/597 |
| 10,257,531 B2 | 4/2019 | Lee et al. | | |
| 11,849,108 B2 * | 12/2023 | Laroche | | H04N 19/91 |
| 12,250,370 B2 * | 3/2025 | Laroche | | H04N 19/176 |
| 2004/0230926 A1 | 11/2004 | Berry et al. | | |
| 2005/0053156 A1 * | 3/2005 | Lin | | H04N 19/112 |
| | | | | 375/E7.184 |
| 2005/0053294 A1 * | 3/2005 | Mukerjee | | H04N 19/51 |
| | | | | 375/E7.125 |
| 2007/0177671 A1 * | 8/2007 | Yang | | H04N 19/70 |
| | | | | 375/E7.199 |
| 2007/0177672 A1 * | 8/2007 | Yang | | H04N 19/597 |
| | | | | 375/E7.176 |
| 2009/0003455 A1 * | 1/2009 | Joung | | H04N 19/597 |
| | | | | 375/E7.076 |
| 2009/0010340 A1 * | 1/2009 | Joung | | H04N 19/198 |
| | | | | 375/E7.076 |
| 2010/0098157 A1 * | 4/2010 | Yang | | H04N 19/70 |
| | | | | 375/240.12 |
| 2010/0315548 A1 | 12/2010 | Suen et al. | | |
| 2013/0083853 A1 | 4/2013 | Coban et al. | | |
| 2015/0023422 A1 | 1/2015 | Zhang et al. | | |
| 2015/0326881 A1 * | 11/2015 | Ikai | | H04N 19/176 |
| | | | | 375/240.12 |
| 2016/0021393 A1 * | 1/2016 | Zhang | | H04N 19/105 |
| | | | | 375/240.12 |
| 2016/0366415 A1 * | 12/2016 | Liu | | H04N 19/463 |
| 2016/0366416 A1 * | 12/2016 | Liu | | G06T 7/246 |
| 2017/0339404 A1 * | 11/2017 | Panusopone | | H04N 19/91 |
| 2017/0339405 A1 * | 11/2017 | Wang | | H04N 19/593 |
| 2017/0347093 A1 * | 11/2017 | Yu | | H04N 19/593 |
| 2017/0347095 A1 * | 11/2017 | Panusopone | | H04N 19/70 |
| 2017/0347096 A1 * | 11/2017 | Hong | | H04N 19/119 |
| 2017/0347102 A1 * | 11/2017 | Panusopone | | H04N 19/46 |
| 2017/0347103 A1 * | 11/2017 | Yu | | H04N 19/1883 |
| 2017/0347123 A1 * | 11/2017 | Panusopone | | H04N 19/119 |
| 2017/0347128 A1 * | 11/2017 | Panusopone | | H04N 19/174 |
| 2018/0063531 A1 * | 3/2018 | Hu | | H04N 19/42 |
| 2018/0098066 A1 * | 4/2018 | Lee | | H04N 19/59 |
| 2018/0098072 A1 * | 4/2018 | Zhang | | H04N 19/426 |
| 2018/0098086 A1 * | 4/2018 | Chuang | | H04N 19/198 |
| 2018/0176587 A1 * | 6/2018 | Panusopone | | H04N 19/82 |
| 2018/0310017 A1 * | 10/2018 | Chen | | H04N 19/52 |
| 2018/0352223 A1 * | 12/2018 | Chen | | H04N 19/182 |
| 2018/0359483 A1 * | 12/2018 | Chen | | H04N 19/70 |
| 2019/0200021 A1 * | 6/2019 | Park | | H04N 19/119 |
| 2019/0230376 A1 * | 7/2019 | Hu | | H04N 19/46 |
| 2019/0238882 A1 * | 8/2019 | Park | | H04N 19/105 |
| 2020/0236390 A1 * | 7/2020 | Galpin | | H04N 19/439 |
| 2021/0344943 A1 * | 11/2021 | Laroche | | H04N 19/44 |
| 2023/0209085 A1 * | 6/2023 | Laroche | | H04N 19/91 |
| | | | | 375/240.02 |

FOREIGN PATENT DOCUMENTS

| | | |
|---|---|---|
| CN | 106105191 A | 11/2016 |
| CN | 106454378 A | 2/2017 |
| WO | 2009/002108 A2 | 12/2008 |
| WO | 2014/103606 A1 | 7/2014 |
| WO | 2018/056603 A1 | 3/2018 |

OTHER PUBLICATIONS

Chien et al., "Extension of Advanced Temporal Motion Vector Predictor (ATMVP)", VCEG-AZ10, Qualcomm Incorporated, ITU—Telecommunications Standardization Sector Study Group 16 Question 6 Video Coding Experts Group (VCEG), 52nd Meeting, Warsaw, Poland, Jun. 19-26, 2015, 4 pages.

ITU-T, "High Efficiency Video Coding", Recommendation ITU-T H.265, Series H: Audiovisual and Multimedia Systems, Infrastructure of Audiovisual Services—Coding of Moving Video, Apr. 2013, 317 pages.

Vetro et al., "Joint Multiview Video Model (JMVM) 7.0", JVT-Z207, Joint Video Team (JVT) of ISO/IEC JTC1/SC29/WG11 and ITU-T SG16 Q. 6, 2008.

Yang, Shuai, "Study on Error Concealment Methods Based on Motion Analysis and Illumination Compensation", China Master Thesis, Retrieved from: http://www.cnki.net, 2011, 80 pages.

Zhang et al., "3D-CE5.h Related: Removal of Parsing Dependency for Illumination Compensation", JCT3V-D0152, MediaTek Inc., Joint Collaborative Team on 3D Video Coding Extension Development of ITU-T Sg 16 WP 3 and ISO/IEC JTC1/SC 29/WG 11, 4th Meeting: Incheon, KR, Apr. 20-26, 2013, pp. 1-4.

Zheng et al., "Intra Prediction Using Template Matching with Adaptive Illumination Compensation", ICIP, 2008, pp. 125-128.

* cited by examiner

*FIG. 1B*

Output
IC(current)

Output
IC(current)

Decoupled predictor and information coding.

Decoupled predictor and information parsing/decoding

DECOUPLED MODE INFERENCE AND PREDICTION

This application is a Divisional Application of U.S. Non-Provisional application Ser. No. 16/652,813, filed Apr. 1, 2020; which is a U.S. 371 National Stage Application of PCT Application No. PCT/US2018/054315, filed Oct. 4, 2018; which claims the benefit of European Patent Application No. 17306332.2, filed Oct. 5, 2017, the disclosures of which are incorporated herein by reference in their entirety.

FIELD OF THE INVENTION

The following described aspects relate generally to the field of video compression, and more particularly to prediction and parsing.

BACKGROUND OF THE INVENTION

In the HEVC (High Efficiency Video Coding of International Telecommunication Union, ITU-T H.265) video compression standard, a picture is divided into so-called Coding Tree Units (CTU), whose size is typically 64×64, 128×128, or 256×256 pixels.

Each CTU is represented by a Coding Tree in the compressed domain. This is a quad-tree division of the CTU, where each leaf is called a Coding Unit (CU.

Motion compensated temporal prediction is employed to exploit the redundancy that exists between successive pictures of a video. To do so, a motion vector is associated with each prediction unit (PU). Each CU is then given some Intra or Inter prediction parameters (Prediction Info) and is spatially partitioned into one or more Prediction Units (PUs), each PU being assigned some prediction information. The Intra or Inter coding mode is assigned on the CU level.

The following description is aimed at ideas solving prediction and parsing issues in digital video coding.

The present embodiments aim to improve the compression efficiency in video encoders by decoupling mode inference and prediction as further explained herein.

SUMMARY OF THE INVENTION

These and other drawbacks and disadvantages of the prior art are addressed by at least one of the described embodiments, which are directed to a method and apparatus for improving the compression efficiency of video encoders and decoders through decoupling mode inference and prediction.

According to at least one general embodiment described herein, there is provided a method for coding a block of video data. The method comprises steps for motion compensating a block of video data, the motion compensating comprising: determining whether a current motion prediction mode for the block is a temporal motion prediction mode; deriving a coding parameter using information from a spatial neighbor when a temporal prediction mode is determined; and, encoding a block of video data, using said coding parameter.

According to at least one general embodiment described herein, there is provided a method for decoding a block of video data. The method comprises steps for decoding a piece of information within a coded video bitstream; predicting the piece of information based on contextual information; performing an inverse combining function of said decoded piece of information and said prediction of said piece of information to generate a piece of information for a current block of video data; and, decoding the motion compensated block of video data.

According to another embodiment, there is provided a method comprising determining whether the coding mode is ATMVP, STMVP or FRUC/unilateral; predicting an illumination compensation flag for the current block of video data from spatial neighboring illumination compensation flags when the determined coding mode is ATMVP, STMVP or FRUC/unilateral; using an illumination compensation flag of a predictor block if the determined coding mode is not ATMVP, STMVP or FRUC/unilateral; and, using the illumination compensation flag for coding the current block of video data.

According to another embodiment, there is provided a method comprising determining whether the coding mode is TMVP. ATMVP or FRUC; predicting an illumination compensation flag for the current block of video data from spatial neighboring illumination compensation flags when the determined coding mode is TMVP, ATMVP or FRUC; using an illumination compensation flag of a predictor block if the determined coding mode is not TMVP, ATMVP or FRUC; and, using the illumination compensation flag for coding the current block of video data.

According to another aspect described herein, there is provided apparatus for coding or decoding a block of video data, comprising: a memory, and a processor, configured to perform any of the aforementioned method embodiments with variations.

According to another aspect described herein, there is provided a nontransitory computer readable storage medium containing data content generated according to the method of any one of the aforementioned method embodiments, or by the apparatus of any one of the aforementioned apparatus embodiments for playback using a processor.

According to another aspect described herein, there is provided a signal comprising video data generated according to the method of any one of the aforementioned method embodiments for coding a block of video data, or by the apparatus of any one of the aforementioned apparatus embodiments for coding a block of video data, for playback using a processor.

According to another aspect described herein, there is provided a computer program product comprising instructions which, when the program is executed by a computer, cause the computer to carry out the method of any one of the aforementioned method embodiments.

These and other aspects, features and advantages of the present principles will become apparent from the following detailed description of exemplary embodiments, which is to be read in connection with the accompanying drawings.

BRIEF DESCRIPTION OF THE DRAWINGS

FIG. 1b shows an example of division of a coding tree unit into coding units, prediction units, and transform units.

DETAILED DESCRIPTION

In the HEVC video compression standard, a picture is divided into so-called Coding Tree Units (CTU), with typical sizes of 64×64, 128×128, or 256×256 pixels.

Figure 1A:
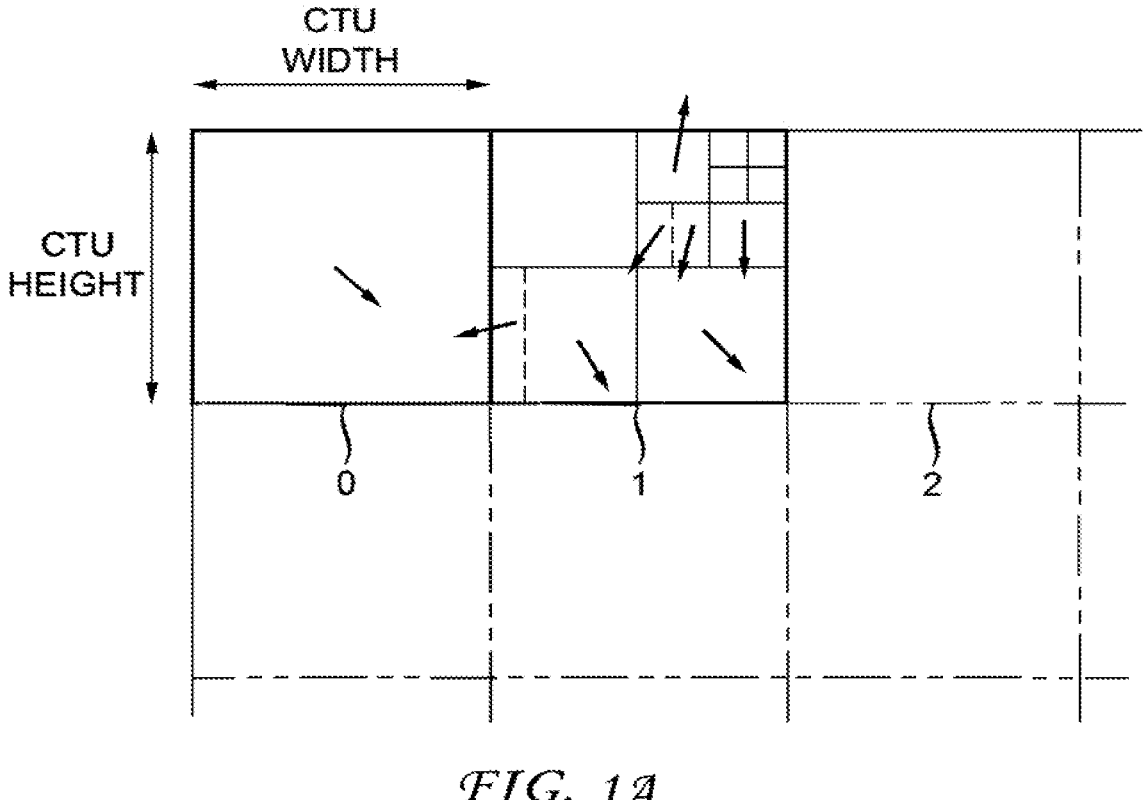
FIG. 1a shows an example of a coding tree unit and coding tree concepts to represent a compressed HEVC picture.

Each CTU is represented by a Coding Tree in the compressed domain. This is a quad-tree division of the CTU, where each leaf is called a Coding Unit (CU), as shown in the example in FIG. 1a.

Figure 1B:
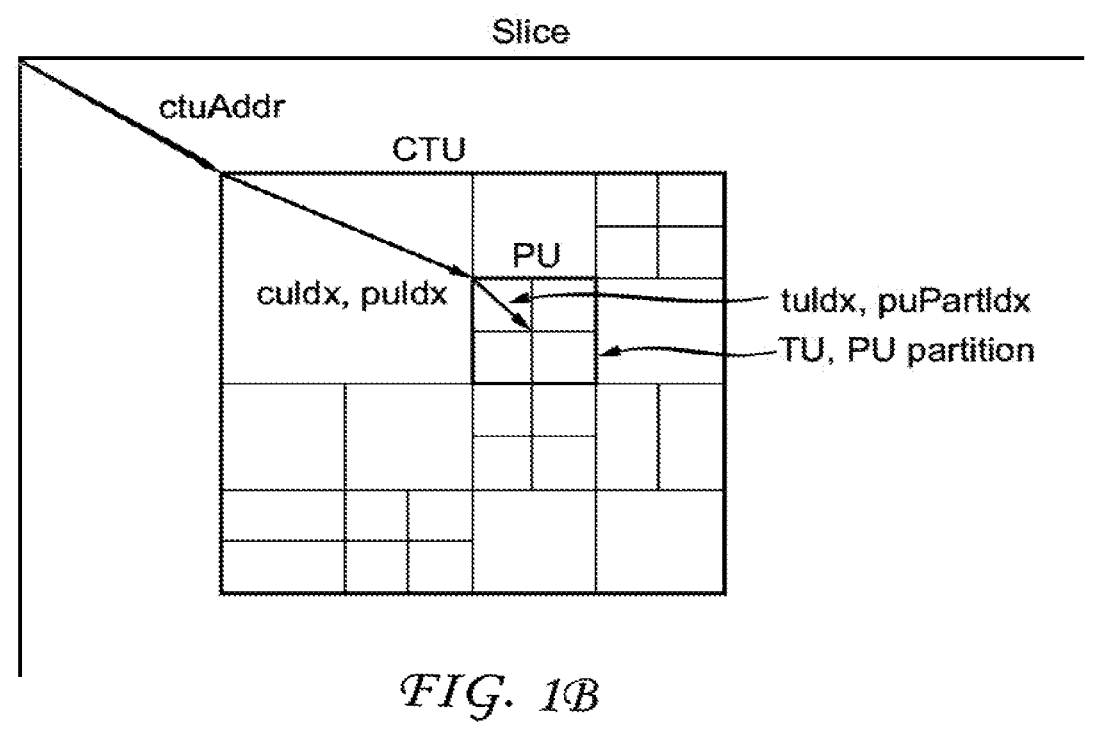

Each CU is then given some Intra or Inter prediction parameters (Prediction Info). To do so, it is spatially partitioned into one or more Prediction Units (PUs), each PU being assigned some prediction information. The Intra or Inter coding mode is assigned on the CU level, as shown in the example of FIG. 1b.

According to the HEVC standard, Coding Units are also divided into so-called transform units, in a recursive way, following a "transform tree". Thus, a transform tree is a quad-tree division of a coding unit, and transform units are the leaf of the transform tree. A transform unit encapsulates the square transform blocks of each picture component corresponding to a considered square spatial area. A transform block is a square block of samples in a single component, where the same transform is applied.

New emerging video compression tools include a Coding Tree Unit representation in the compressed domain to represent picture data in a more flexible way in the compressed domain. The advantage of this flexible representation of the coding tree is that it provides increased compression efficiency compared to the CU/PU/TU arrangement of the HEVC standard.

The domain of the described embodiments is video compression. For inter coding, prediction of a given block is obtained by a motion compensated block from a reference picture. Such prediction is built from a motion vector which can undergo motion transformation used to motion compensate the block. Optionally the prediction can be processed by a sample transformation, for example using the IC (Illumination Compensation) transformation. Such transformations may be activated or de-activated using a flag, either coded or inferred. When predicting/inferring the flag corresponding to such transformations for the current block, current solutions generally predict/infer the flag from the motion predictor block (the block from which the motion is predicted). The predictor block can be in the spatial neighbor of the current block (spatial motion predictor block), or it can be in a reference picture (temporal motion predictor block). However, for temporal motion predictor (like the ones in the ATMVP (Advanced Temporal Motion Vector Prediction), STMVP (Spatial Temporal Motion Vector Prediction) or FRUC (Frame Rate Up Conversion) modes of the JEM (Joint Exploration Model)), such flags might not be available.

The encoding/decoding process described here is the one used in another application for an equi-rectangular projection predictor for omnidirectional video, but is applicable to other flags or syntax elements (like IC, or OBMC (overlapped block motion compensation) and IMV (initial motion vector)).

The following description is aimed at ideas solving prediction and parsing issues in digital video coding. The issues are that for predicting or parsing an information, contextual data are required, but these contextual data may not always be available. Solutions are proposed to improve the prediction and parsing processes for such cases.

The Following are Two of the Solutions Considered:

First, the inference and predictor block for inter modes TMVP, ATMVP, STMVP, FRUC/unilateral can be decoupled. This proposed idea aims mostly at improving the prediction process of the information.

Second, CABAC context can be removed. In this embodiment, decouple the CABAC context and a predictor block for inter coding to avoid the non-availability of the piece of information for the parsing. When a given piece of information, for example the IC flag, or symbol is coded or decoded using CABAC, contextual information from spatial neighbors may need to be available in order to select the CABAC context; however, in the decoder, this contextual information may be not directly available when the bitstream is parsed, but needs to be first decoded (or reconstructed) from the decoded data; therefore the parsing process becomes dependent on the decoding process, which is generally not desired nor recommended. To solve this issue, it is proposed to decouple the contextual CABAC encoding of the symbol from the decoding process of the contextual (spatial/temporal) neighboring information. A concrete implementation of this idea is to use neighboring blocks (e.g. Above and Left blocks) to predict the symbol. What is coded is the combination, for example by an "XOR" operator, of the actual symbol value and of the prediction value. Similarly, at a decoder, the decoded value is inverse combined with the prediction value, for example using XOR. The parsing of the decoded value may use CABAC contexts, but these contexts do not depend on neighboring information not yet available during the parsing. Hence, the coded/decoded value is not directly linked to the contextual (spatial/temporal) neighboring information related to the symbol.

If the combining function is $$c = f(v,p)$$

v being the value of INF, p being the prediction, c the result of the combining function, the inverse combining function g is such that:

$$g(c,p) = v$$

At an encoder, c is encoded. At a decoder c is decoded (parsed), and v is reconstructed by computing g(c, p). When f is chosen as the XOR operator, g is simply also XOR. This works when INF is a flag.

Another idea aims at addressing the parsing issue when decoding the information. At least one embodiment consists in decoupling the inference/prediction of a flag from the predictor block in inter motion compensation. Some advantages in this approach are that it increases the number of cases where a predictor for the flag is available and/or improves the accuracy of the prediction, and therefore coding, for the given flag.

The domain of the described embodiments is the video compression. For inter coding, prediction of a given block (or coding unit, also noted CU) is given by a motion compensated block. Such prediction is built from a motion vector which can undergo transformation used to motion compensate the block. Optionally the prediction can be processed by a transformation, for example the IC (Illumination Compensation) transformation.

The motion compensation tools in existing codecs such as H.265 (ITU-T, 2013) are based on the description of the motion of a current block between the current frame and a reference frame, which has already been decoded. This motion is classically represented with a 2D vector and a reference frame index, which informs the decoder on which reference frame to select among a set of previously decoded frames stored in the reference pictures buffer.

Figure 1C:
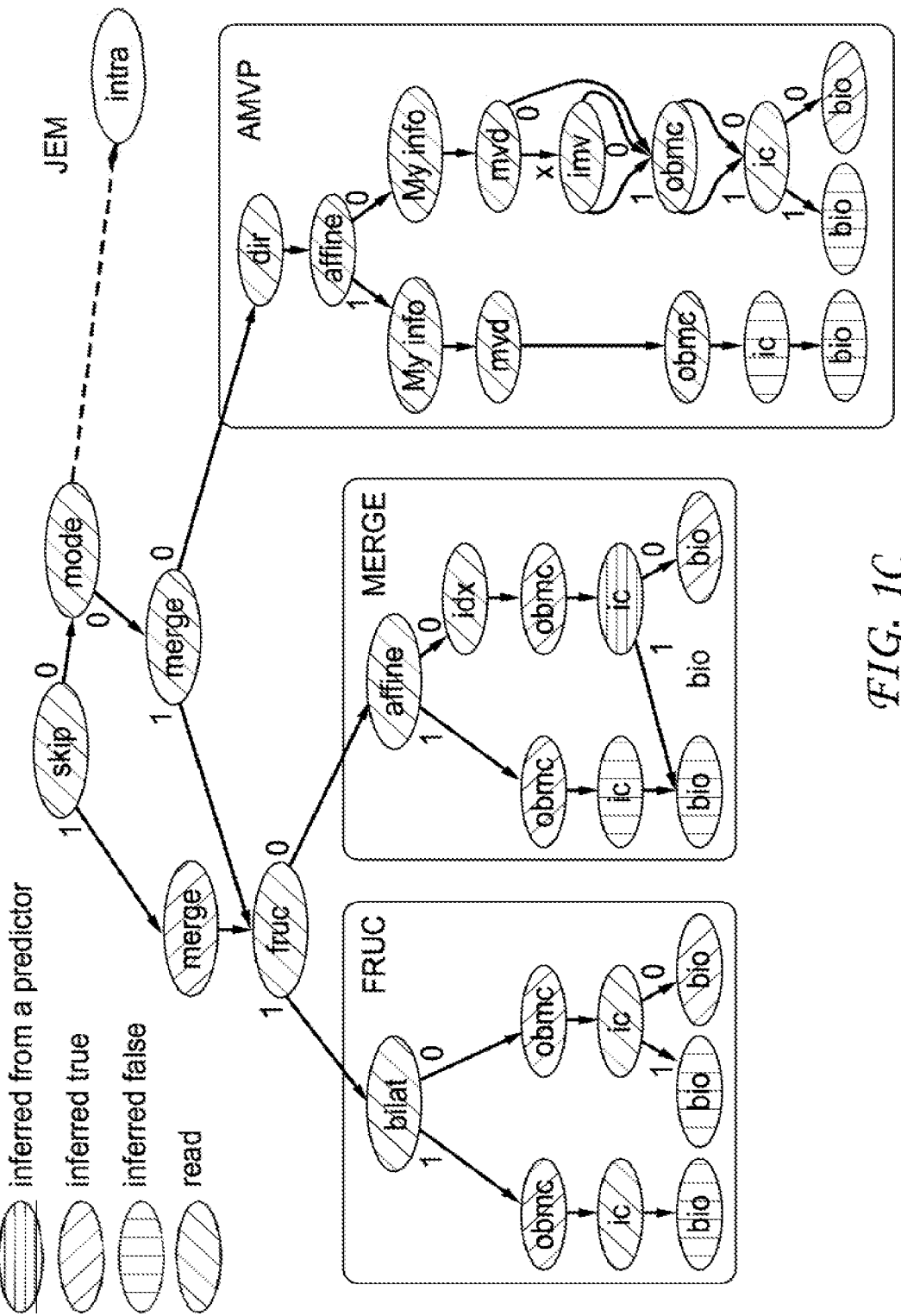
FIG. 1c shows one example of a coded at a tree for a motion compensated block.
Figure 2:
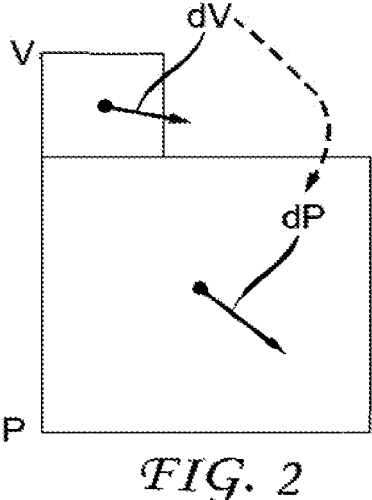
FIG. 2 shows an example of spatial motion vector prediction.
Figure 3:
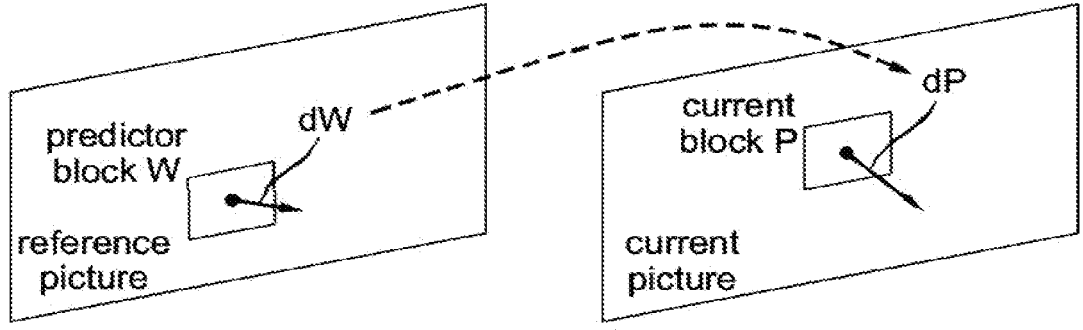
FIG. 3 shows an example of temporal motion vector prediction.

In order to predict the block, several pieces of information can be coded or inferred for the current block. The following list refers to the notations of FIG. 1c, which depicts an example of data coding tree for an inter block:

A. Motion vector prediction index (IDX or MV INFO)
B. Refinement of the motion vector predictor (MERGE, FRUC)
C. Refinement of the prediction (FRUC, BIO)
D. Direction of motion compensation (uni- or bi-directional, indicated in DIR)
E. Type of motion compensation (AFFINE)
F. Sub-block motion compensation (OBMC)
G. Illumination Compensation of the block (IC)
H. Integer Motion Vector (IMV)
I. When coding or inferring some of these information, a common method is to predict/infer the information from the block used to predict the motion vector.
J. For example, in FIG. 2, the motion vector is spatially predicted from neighboring blocks. The current block P uses the spatial neighbor block V for the motion prediction: the motion vector dP of block P is predicted from the motion vector dV of block V. Similarly, other information (like IC in MERGE mode) from the block V can be used to predict or infer the corresponding information for the block P.
K. In another example, in FIG. 3, the motion vector is temporally predicted from blocks from a reference picture. The current block P uses the block W, located in a reference picture, for the motion prediction: the motion vector dP of block P is predicted from the motion vector dW of block W. Similarly, other information (like IC or parameters values) from the block W can be used to predict or infer the corresponding information for the block P. For instance, in the JEM, different modes are temporal motion predictors: TMVP or ATMVP or STMVP or FRUC/unilateral.
L. Of course, this requires that the information is property stored in the blocks used to predict the information of the block P.

Figure 4:
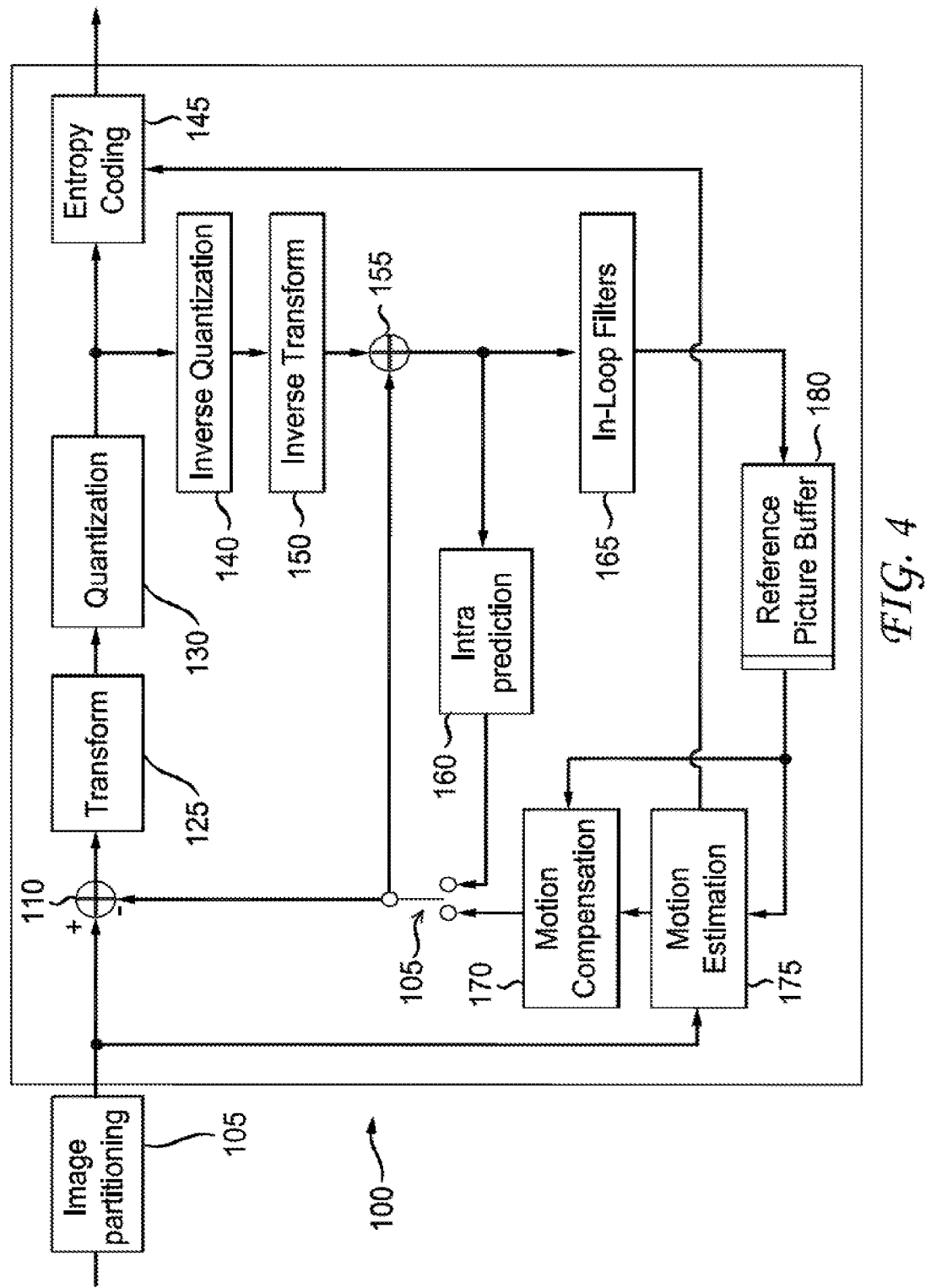
FIG. 4 shows an example of a generic video compression scheme to which the present embodiments can be applied.
Figure 5:
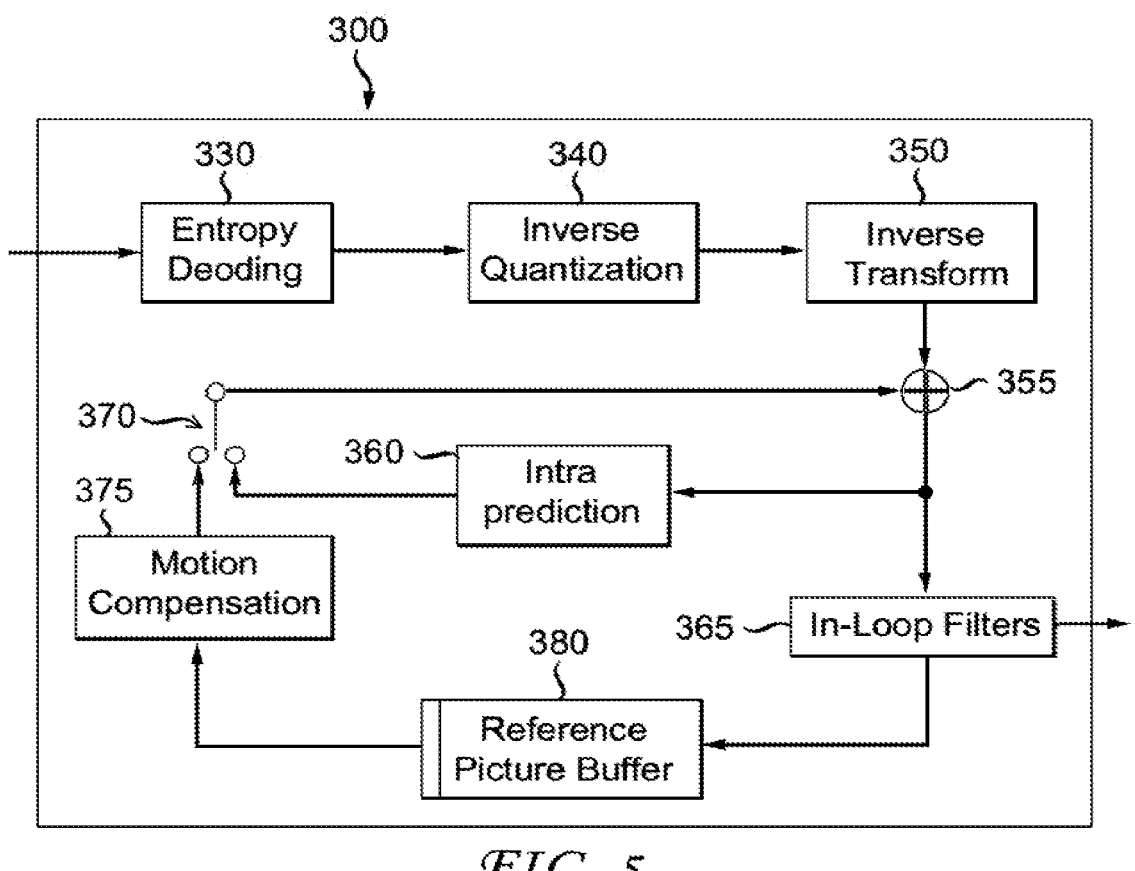
FIG. 5 shows one example of a generic video decompression scheme to which the present embodiments can be applied.

FIG. 4 and FIG. 5 depict classical video encoders and decoders, respectively. The current embodiments concern two points. The embodiments change the way of predicting or inferring syntax elements or parameters of a motion compensated block (i.e. a non intra block), i.e. mainly impacting 170 in FIGS. 4 and 275 in FIG. 5. They also relate to the parsing of a video stream, and therefore impacts block 145 of FIG. 4 and 230 of FIG. 5.

With the aforementioned prior-art prediction or inferring method described above, four issues can arise.

A. Non-availability of the information for the prediction—For some prediction modes of the motion vector, like the temporal prediction in TMVP or ATMVP or STMVP or FRUC/unilateral, the information might be not available anymore in the blocks of the decoded reference picture. Typically, in order to reduce the memory needs, only the information related to the motion vector(s) and reference frame are stored in reference pictures buffer in HEVC or in the JEM. The other information, such as the IC flag and parameters, the Affine flag and parameters, are not stored. For instance, in FIG. 3, only dW is stored for block W, but the IC flag is not stored and cannot be used to predict the IC flag of the current block P.

B. Non-availability of the Information for the parsing—When a given information (for example the IC flag) or syntax element is coded/decoded using CABAC, contextual information from spatial neighbors may need to be available in order to select the CABAC context; however, in the decoder, this contextual information may be not directly available when the bitstream is parsed, but needs to be first decoded (or reconstructed) from the decoded data; therefore the parsing process becomes dependent on the decoding process, which is generally not desired nor recommended; usually, it is widely preferred to be perform the parsing process independently from the decoding/reconstruction process.

This problematic case can, for example, happen when a syntax element (SE) being parsed depends on contexts depending on neighboring coding units (CUs) of the current block, that are coded with Merge mode; when a CU is coded with Merge mode, all its parameters are deduced but not explicitly coded in the stream; therefore, during the parsing of the stream, these parameters are not yet known; and they cannot be used for parsing the syntax element SE.

C. Low correlation of the Information—In case of FRUC predictor, the information of the chosen candidate (the predictor block) might not be completely correlated with the information of the current block; this is notably because the block is selected based on a SAD (Sum of Absolute Differences) criteria.

D. Non-unicity of the Information inside a coded block/CU—in case of ATMVP and STMVP, several flags (or syntax elements) from neighboring blocks might be used to predict or infer the flag (or syntax element) of the current block. In ATMVP, an initial "temporal" motion vector predictor is computed from neighboring blocks and then refined for all sub-PU blocks where another motion vector predictor (with different flag value) might be finally used. Moreover, in STMVP, several motion vector predictors are averaged from several blocks, leading to several (potentially different) flag inference.

In current implementation of the JEM (Joint Exploration Model), two methods are used to avoid these issues:

Case A: When using temporal inference (for deriving the IC flag for example), additional memory is used to store the IC flag in the reference picture buffer.

Case B: The flag never uses spatial context for encoding (for example IC flag). It increases the coding cost of the flag since the entropic coding does not use the spatial context. Case B: The flag is never inferred (like for IMV flag). It might decrease the performance by adding information to encode.

Case C: for IC, the flag is not inferred but explicitly coded. This might decrease the performance by adding information to encode.

Case D: for IC, the flag is inferred from the initial temporal motion vector predictor in ATMVP and propagates to all the sub-PU blocks. In STMVP, the flag is copied from the ATMVP block. This might decrease the performance by inferring a flag badly correlated with the current block mode.

In the following, it is considered that a given piece of information, which can be referred to as INF (which can be, for example, the value of the IC flag), of the current block has to be predicted or inferred from predictor blocks, either located in the spatial neighbor of the current block, co-located in reference pictures or in a FRUC/unilateral (frame rate up conversion) motion field.

The described embodiments cover at least two separate aspects. The first aspect is forcing the prediction of the information INF to be based on spatial neighbors—this point is covered at least in the first two embodiments. The second aspect is parsing the information INF using decoupled predictors—this point is covered at least by the third embodiment.

In a first general embodiment, the information INF inference/prediction for motion predicted blocks can be decoupled.

Figure 6:
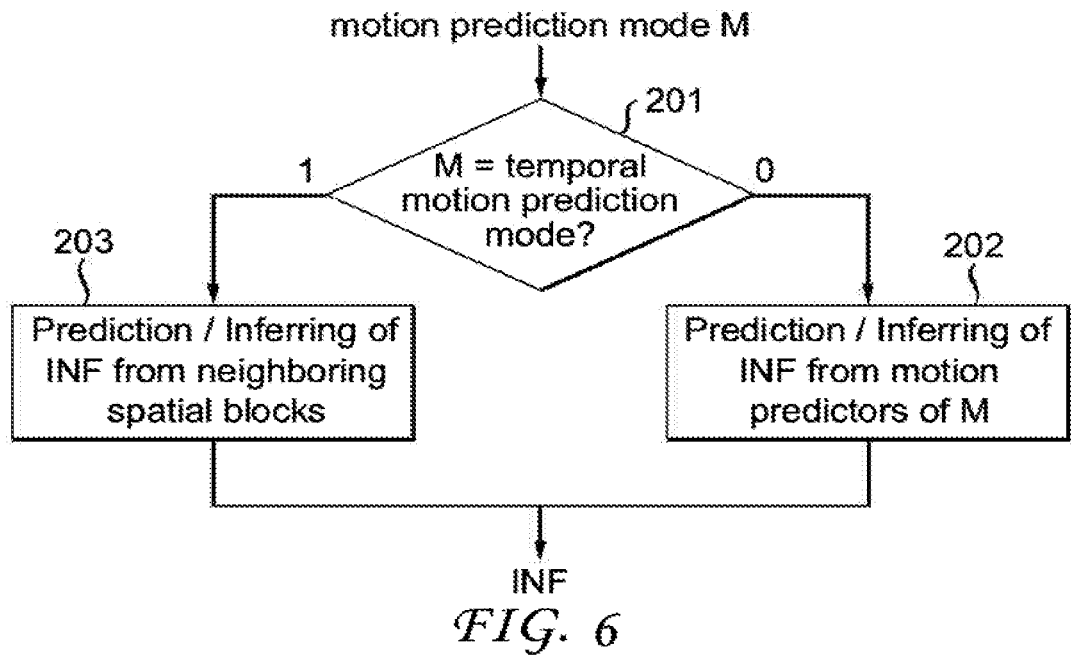
FIG. 6 shows an example block diagram of information prediction/inferring from spatial predictors.

In order to solve issue A and D, the embodiment proposes to predict/infer the information INF from spatial neighbors even when the motion predictor of the current block is built using a temporal prediction, for instance using ATMVP, STMVP or FRUC/unilateral modes. The concept is shown in the block diagram of FIG. 6. The input of the prediction/inferring process of INF is the motion prediction mode M of the current block. First, a checking step is applied to evaluate if the mode M corresponds to a temporal prediction or a spatial prediction (step 201). If M corresponds to a spatial prediction, the prediction/inferring of INF is made using the corresponding information from the spatial predictor blocks used to prediction M (step 202). If M corresponds to a temporal prediction, the prediction/inferring of INF is made using the corresponding information from spatially neighboring predictor blocks, not used to prediction M and therefore different from the blocks used to predict M (step 203).

A first alternative to the first embodiment involves the application to ATMVP, STMVP or FRUC/unilateral modes.

Figure 7:
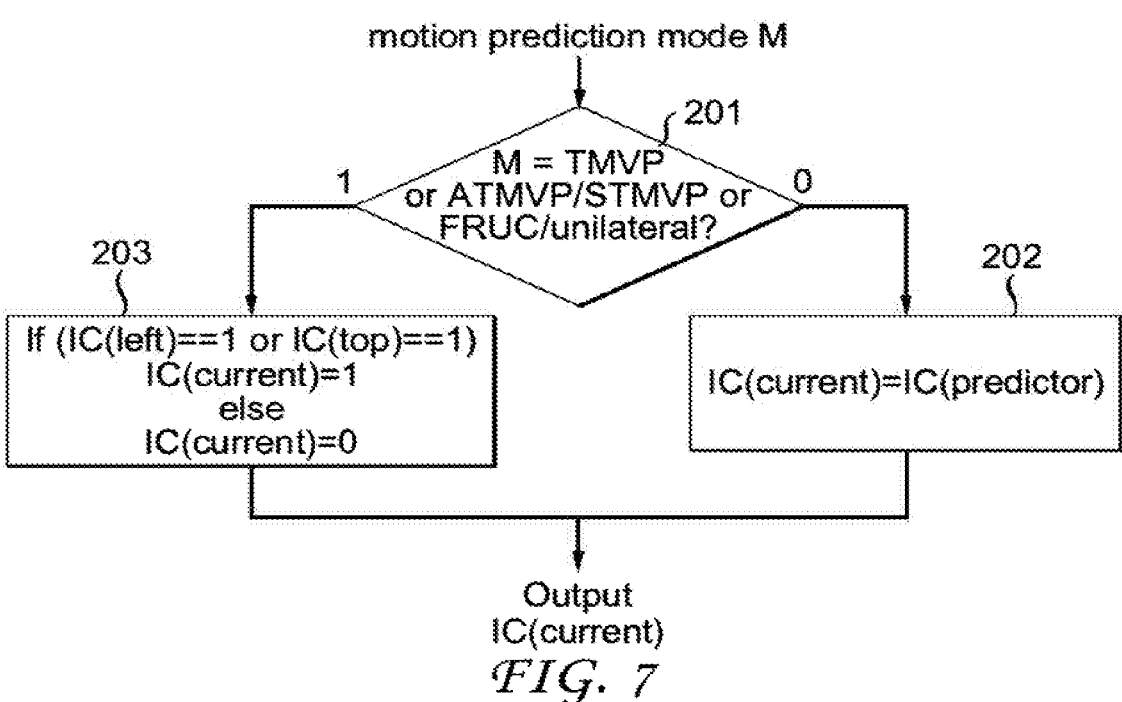
FIG. 7 shows an example block diagram for illumination compensation (IC) flag prediction/inference.

The block diagram of FIG. 7 shows the implementation of this process for INF corresponding to the flag IC. In step 201, the mode M is compared to the ATMVP, STMVP or FRUC/unilateral modes. If M is one of these modes, the IC flag of the current block is spatially predicted/inferred from the TOP and LEFT block IC flags when the current motion predictor block is coming from ATMVP, STMVP or FRUC/unilateral candidates. This corresponds to step 203. If M is none of the ATMVP. STMVP or FRUC/unilateral modes, the IC value of the predictor block is used. This corresponds to step 202.

Figure 8:
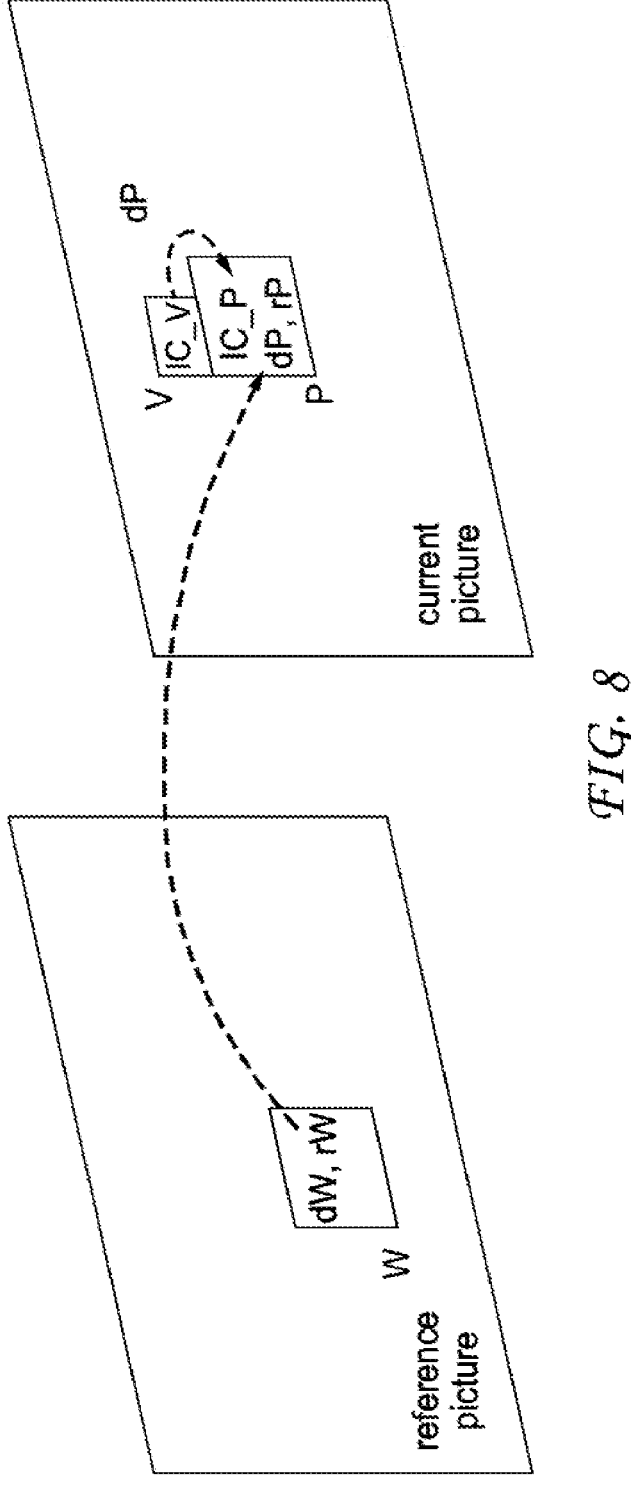
FIG. 8 shows an example illustration of temporal motion prediction and spatial prediction of an IC flag.

The concept of this embodiment, corresponding to the block diagram of FIG. 7, is also explained in FIG. 8. FIG. 8 illustrates how the process of FIG. 7 applies for deriving the motion vector and the IC flag of a block. The motion vector dP and reference index rP of block P in the current picture are temporally predicted by the motion vector dW and reference index rW of block W in the reference picture. However, the IC flag IC_P of block P is predicted from the IC flag IC_V of a spatially neighboring block V.

A second alternative to the first embodiment involves the application to ATMVP, STMVP or FRUC modes.

Figure 9:
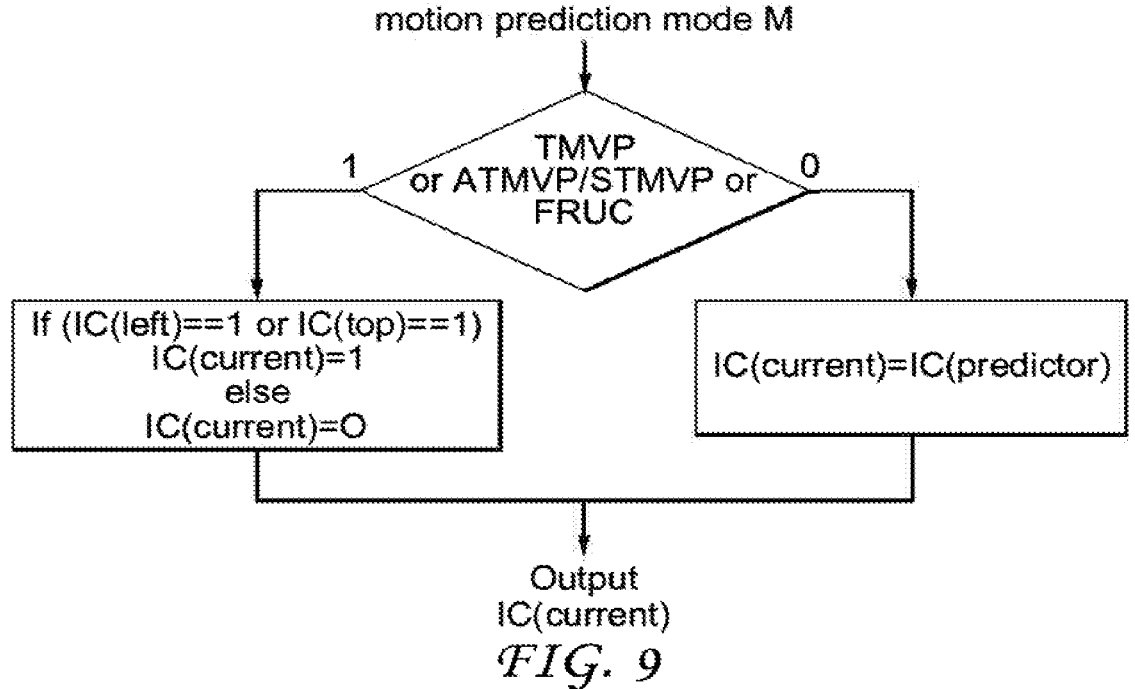
FIG. 9 shows another example of a block diagram for IC flag prediction/inference.
Figure 10:
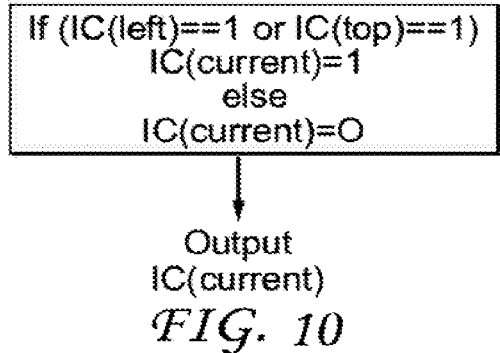
FIG. 10 shows an example block diagram of another IC flag prediction/inference.

In order to solve issue A and C, we propose to predict/infer the information INF from spatial neighbors when the motion predictor of the current block is ATMVP, STMVP or FRUC (FIG. 9).

A third alternative of the first general embodiment involves the use of spatial predictors for IC flag.

In order to solve issue A, B and C, we propose to always predict/infer the information INF from spatial neighbors.

In a second general embodiment, there is a single INF prediction for all sub-PUs in STMVP mode.

Figure 11:
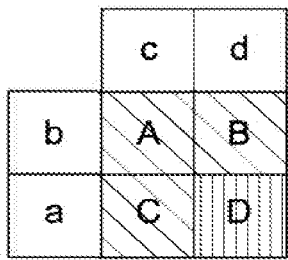
FIG. 11 shows an example of sub-PU derivation process in STMVP (Spatial Temporal Motion Vector Prediction).

In STMVP, the motion vectors of the sub-PUs are derived recursively, following raster scan order. This is illustrated in FIG. 11, where a CU contains four sub-Pus (or sub-CUs), noted A, B, C, D. The CU has fours neighboring blocks a, b, c, d.

The motion derivation for sub-PU A uses the motion from the two spatial neighbors, b and c, plus the temporal motion vector predictor (TMVP) of sub-block K Finally, a merging of the (up to three) motion vectors is achieved (e.g. by averaging them). The same process then applies to block B, with spatial neighbors A, d and the temporal motion vector predictor (TMVP) of sub-block B. And so on for the two remaining blocks of the CU.

In one embodiment, in order to solve D, the information INF is deduced from the neighboring PU at block level (not sub-PU) using above methods. One single prediction of INF is used for all sub-PUs of the current block. The derivation of INF therefore differs from the derivation of the motion vectors, for which the recursive STMVP process is maintained. The same information INF is then available for all sub-PUs.

A third general embodiment involves flag coding using decoupled predictor.

In order to solve issue B, but also to improve the coding efficiency of an information INF, linked to the current block, coded in a mode that involves cascading of several prediction processes (as for instance the prediction of the motion vector by the FRUC mode), we propose to decouple the contextual CABAC encoding of INF from the decoding process of the contextual (spatial/temporal) neighboring information. The point here is to use a predictor for INF which depends on another predictor (for example in case of IC flag for a current block being coded in FRUC mode, the IC predictor depends on the IC flag of the predictor selected by FRUC). In the prior-art, in such cases of prediction cascading, no predictor is used for coding INF.

Figure 12:
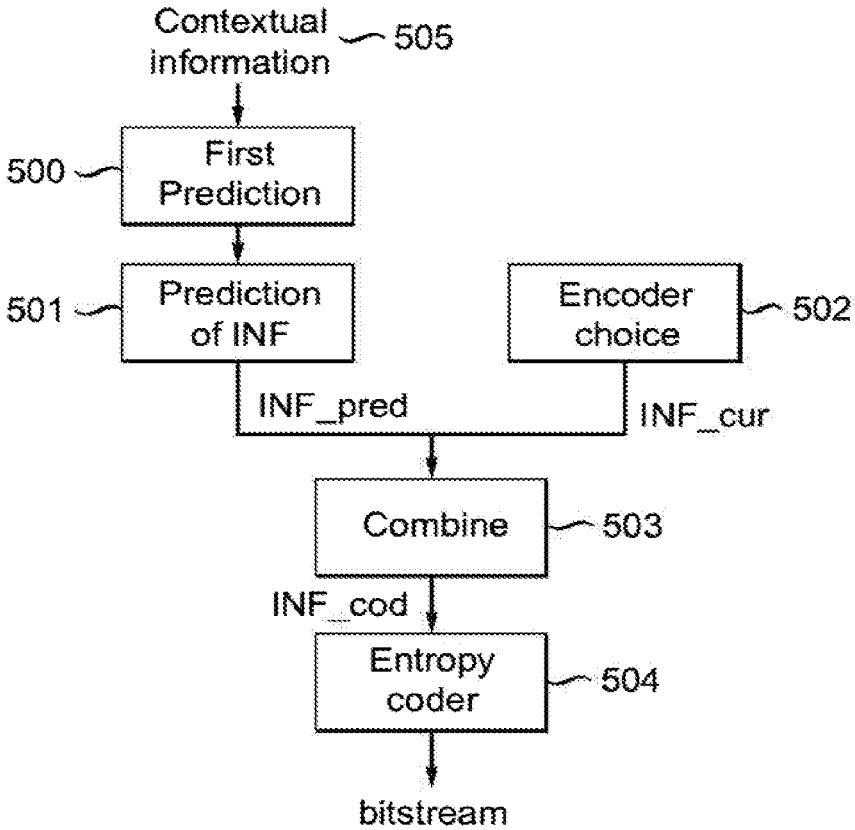
FIG. 12 shows a block diagram of decoupled predictor and information coding.

FIG. 12 shows a simplified block diagram of the encoder side, for coding the information INF_cur of a given block. When coding this information, contextual information (505) is available, from previously encoded blocks in the neighborhood of the current block or in reference pictures. For instance, it consists in a list of candidate motion vectors from the neighborhood of the block of from blocks in reference pictures. From this contextual information, a first prediction (500) is performed, for instance the prediction of the motion vector to be used by the block by the FRUC mode. From this first prediction, a predictor of INF_cur, noted INF_pred, is generated (501). The encoding process also performs the choice of the actual value of the information INF, typically based on rate-distortion optimization (502). INF_pred and INF_cur are then combined to generate the value of the information to be coded, INF_cod. INF_cod is then coded by the entropy coder (504) into the output bitstream. In step 504 of entropy coding, contexts can be used to code the INF_cod. But these contexts shall only depend on data directly available from the parsing process, but not from data directly available after the decoding/reconstruction process. Hence, the parsing can be decoupled from the decoding process.

Figure 13:
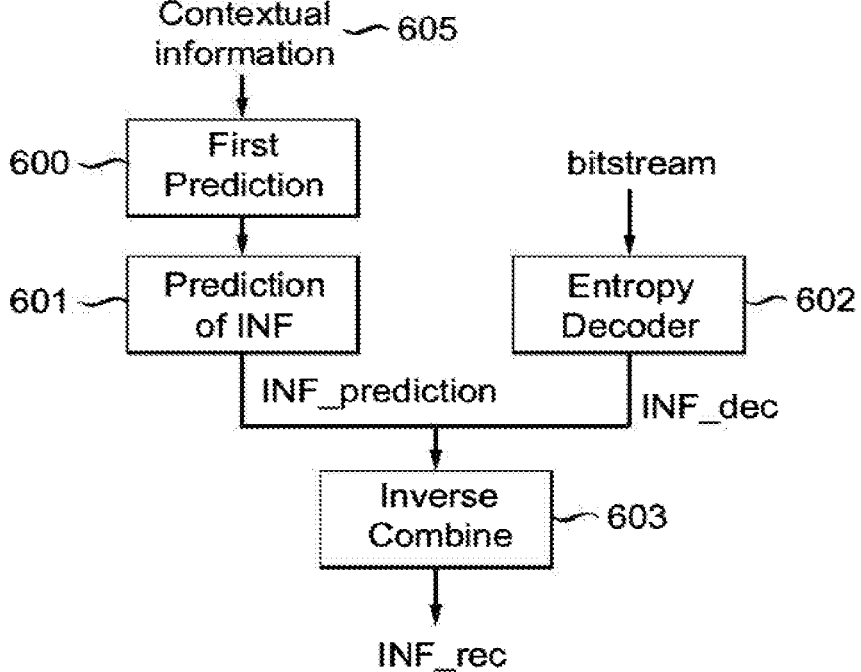
FIG. 13 shows a block diagram of decoupled predictor and information parsing/decoding.

FIG. 13 shows a simplified block diagram of the decoder side, for decoding the information INF_cur of a given block. From the bitstream, the information INF_dec is decoded (602). This is the same as INF_cod of the encoder side in FIG. 12. The parsing of this information is decoupled from the reconstruction/decoding process, by using contexts that only depend on data directly available from the parsing process, but not from data directly available after the decoding/reconstruction process.

A first prediction (600) is performed, for example, the prediction of the motion vector to be used by the block by the FRUC mode. This prediction uses the decoded (or reconstructed) contextual information (605), for instance made of a list of candidate motion vectors from the neighborhood of the block of from blocks in reference pictures. A prediction of the information, INF_pred, is then generated (601) from this first prediction. INF_pred and INF_cod are then re-combined (using the inverse of the combine operation performed at the encoder side) to generate the value of the information of the current block, INF_rec, that shall be the same as INF_cur of the encoder side.

Figure 14:
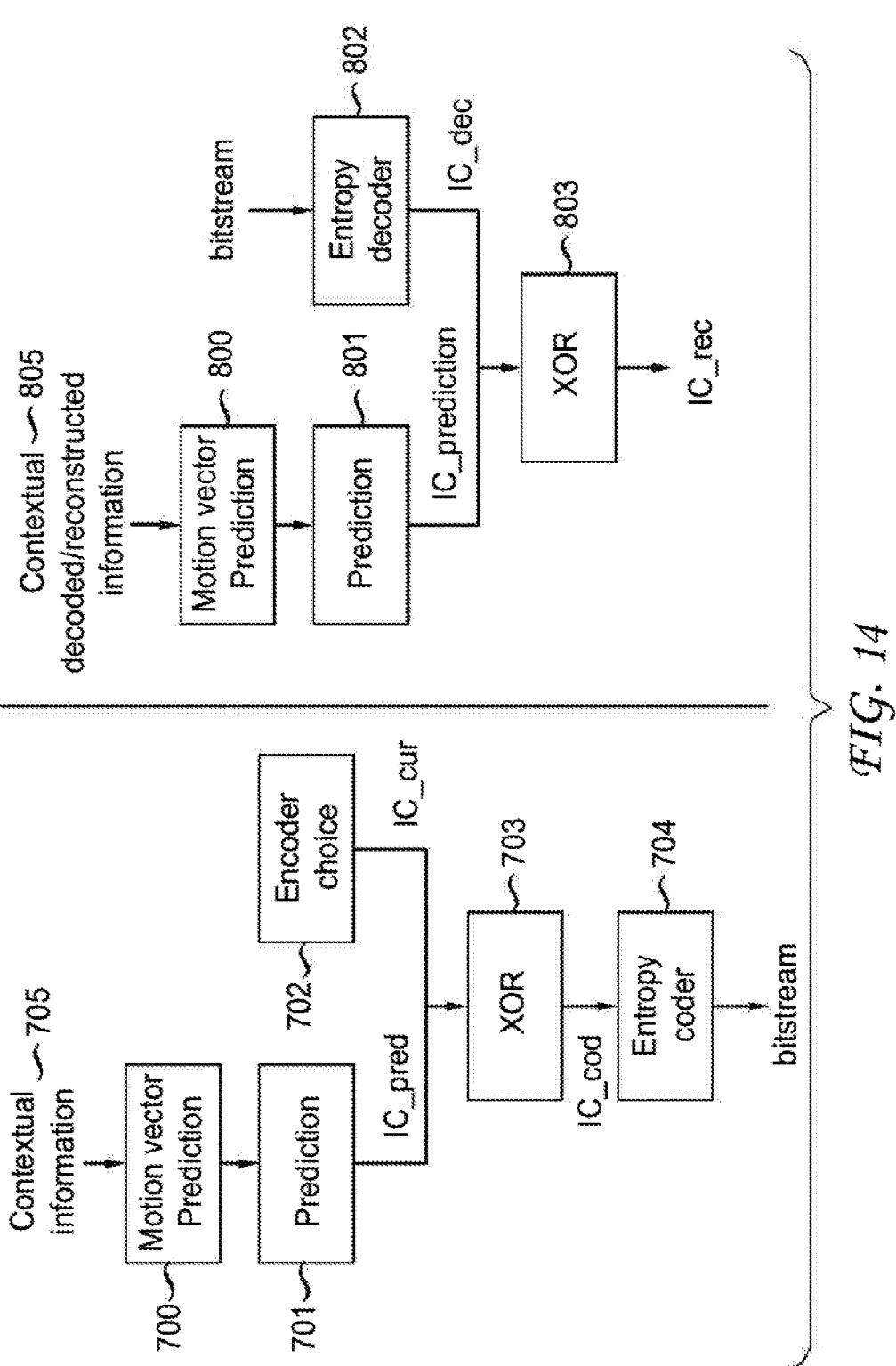
FIG. 14 shows a block diagram of decoupled predictor and flag coding.

FIG. 14 shows the encoder (left) and decoder (right) for the IC flag, according to one embodiment. In this embodiment, the first prediction is the prediction of the motion vector to be used for temporally predicting the block signal. And the "Combine" and "inverse combine" operations simply consist of applying an "XOR" operator.

IC_cod=IC_cur XOR IC_pred

IC_rec=IC_dec XOR IC_pred

In FIG. 8, the example of the IC flag where the contextual CABAC coding is replaced by a regular coding of the predictor of the flag is shown. The predictor is then allowed to come from either of the spatial neighbors (solving issues A and C) or from the predictor block flag.

Figure 15:
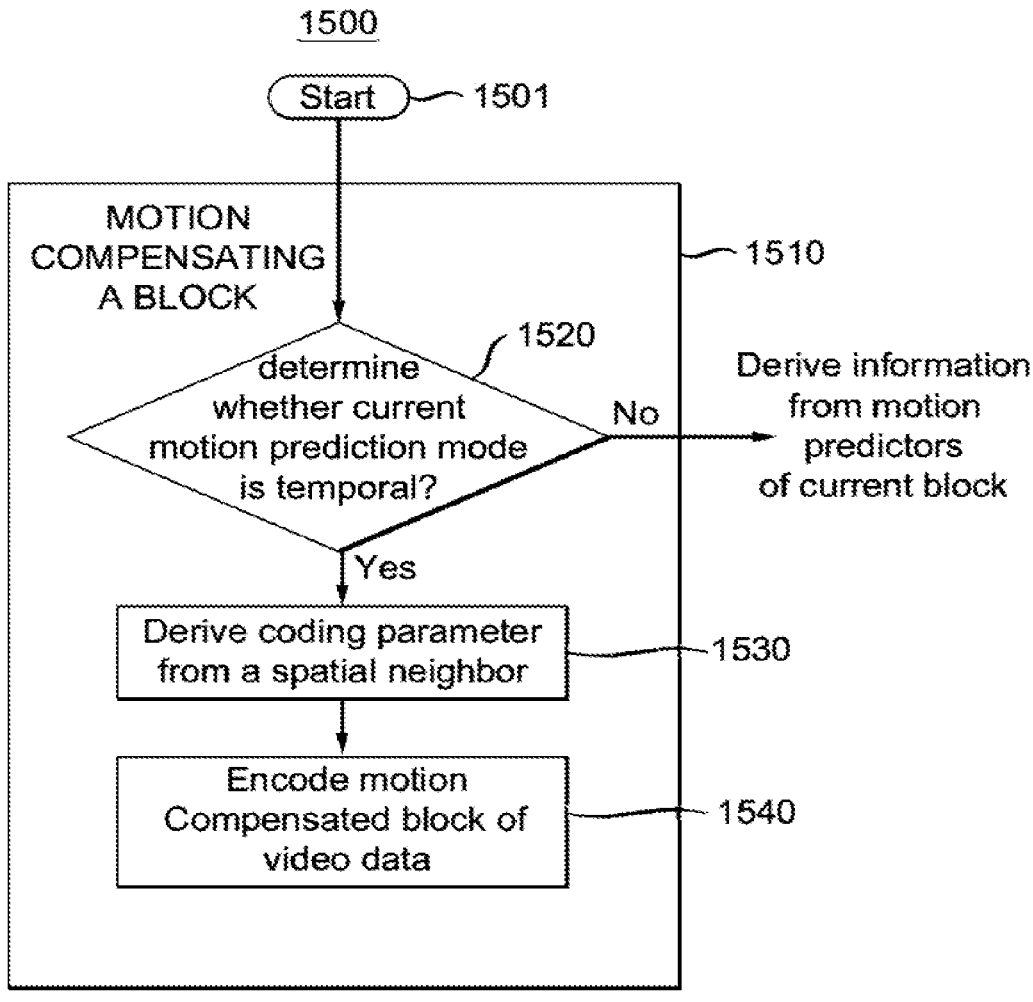
FIG. 15 shows one embodiment of an encoding method using the aspects described.

FIG. 15 shows one embodiment of a method 1500 under the aspects described. The method commences at Start block 1501 and control proceeds to block 1510 for motion compensating a block of video data. The motion compensation process comprises block 1520, 1530 and 1540. At Block 1520, the method proceeds to determine whether a current motion prediction mode is a temporal prediction mode. If not, derivation of information is made from motion predictors of the current block. If, however, the current motion prediction mode is temporal, control proceeds from block 1520 to block 1530 for deriving a coding parameter from a spatial neighbor. Control then proceeds from block 1530 to block 1540 for encoding a motion compensated block of video data.

Figure 16:
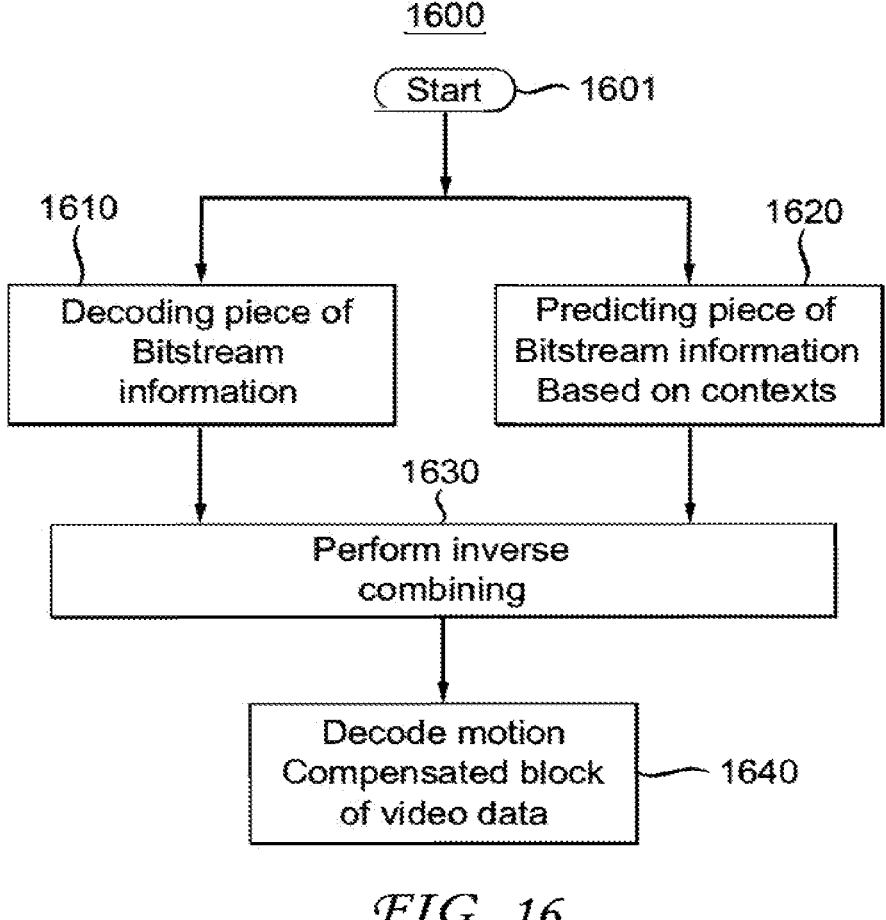
FIG. 16 shows one embodiment of a decoding method using the aspects described.

FIG. 16 shows one embodiment of a method 1600 under the aspects described. The method commences at Start block 1601 and control proceeds to block 1610 for decoding a piece of bitstream information and to block 1620 for predicting a piece of bitstream information based on contextual information. Control proceeds from blocks 1610 and 1620 to block 1630 for performing an inverse combining operation. Control proceeds from block 1630 to block 1640 for decoding a motion compensated block of video data using the piece of information.

Figure 17:
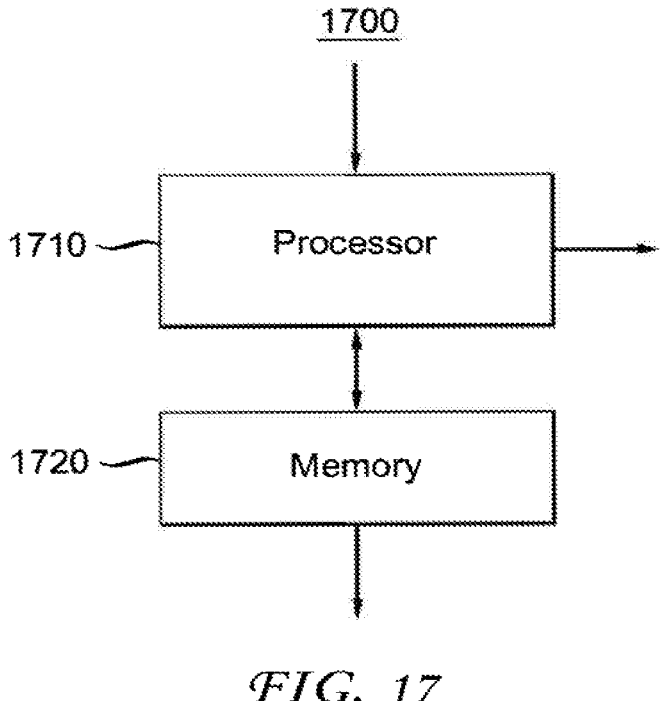
FIG. 17 shows one embodiment of an apparatus for encoding or decoding using the aspects described.

FIG. 17 shows one embodiment of an apparatus 1300 for coding or decoding a block of video data. The apparatus comprises Processor 1310 which has input and output ports and is in signal connectivity with Memory 1320, also having input and output ports. The apparatus can execute any of the aforementioned method embodiments, or variations.

The functions of the various elements shown in the figures can be provided using dedicated hardware as well as hardware capable of executing software in association with appropriate software. When provided by a processor, the functions can be provided by a single dedicated processor, by a single shared processor, or by a plurality of individual processors, some of which can be shared. Moreover, explicit use of the term "processor" or "controller" should not be construed to refer exclusively to hardware capable of executing software, and can implicitly include, without limitation, digital signal processor ("DSP") hardware, read-only memory ("ROM") for storing software, random access memory ("RAM"), and non-volatile storage.

Other hardware, conventional and/or custom, can also be included. Similarly, any switches shown in the figures are conceptual only. Their function can be carried out through the operation of program logic, through dedicated logic, through the interaction of program control and dedicated logic, or even manually, the particular technique being selectable by the implementer as more specifically understood from the context.

The present description illustrates the present ideas. It will thus be appreciated that those skilled in the art will be able to devise various arrangements that, although not explicitly described or shown herein, embody the present ideas and are included within its scope.

All examples and conditional language recited herein are intended for pedagogical purposes to aid the reader in understanding the present principles and the concepts contributed by the inventor(s) to furthering the art, and are to be construed as being without limitation to such specifically recited examples and conditions.

Moreover, all statements herein reciting principles, aspects, and embodiments of the present principles, as well as specific examples thereof, are intended to encompass both structural and functional equivalents thereof. Additionally, it is intended that such equivalents include both currently known equivalents as well as equivalents developed in the future, i.e., any elements developed that perform the same function, regardless of structure.

Thus, for example, it will be appreciated by those skilled in the art that the block diagrams presented herein represent conceptual views of illustrative circuitry embodying the present principles. Similarly, it will be appreciated that any flow charts, flow diagrams, state transition diagrams, pseudocode, and the like represent various processes which can be substantially represented in computer readable media and so executed by a computer or processor, whether or not such computer or processor is explicitly shown.

In the claims herein, any element expressed as a means for performing a specified function is intended to encompass any way of performing that function including, for example, a) a combination of circuit elements that performs that function or b) software in any form, including, therefore, firmware, microcode or the like, combined with appropriate circuitry for executing that software to perform the function. The present principles as defined by such claims reside in the fact that the functionalities provided by the various recited means are combined and brought together in the manner which the claims call for. It is thus regarded that any means that can provide those functionalities are equivalent to those shown herein.

Reference in the specification to "one embodiment" or "an embodiment" of the present principles, as well as other variations thereof, means that a particular feature, structure, characteristic, and so forth described in connection with the embodiment is included in at least one embodiment of the present principles. Thus, the appearances of the phrase "in one embodiment" or "in an embodiment", as well any other variations, appearing in various places throughout the specification are not necessarily all referring to the same embodiment.

In conclusion, a method of predicting or inferring a piece of information for encoding or decoding is provided. Instead of predicting or inferring the information, such as a flag for a current block, a predictor from a spatial neighbor can be used, or from a reference picture. This procedure can be used in several ways, or used in various motion vector prediction modes, such as FRUC or AMP. Other embodiments provide other methods and combinations to derive or infer motion information to increase coding efficiency.

The invention claimed is:

1. A method of decoding video data, comprising:
obtaining a first piece of information from a video bitstream, wherein the first piece of information is associated with a current video block and includes a combination of an actual value of a parameter and a prediction value associated with the first piece of information;
determining the prediction value associated with the first piece of information based on one or more neighboring video blocks of the current video block or based on contextual information associated with the current video block;
performing an inverse combining function on the first piece of information and the prediction value to derive a second piece of information, wherein the inverse combining function is inverse to a combining function used by a video encoding device to combine the actual value of the parameter and the prediction value; and
decoding the current video block based on the second piece of information.

2. The method of claim 1, wherein the first piece of information indicates the value of an illumination compensation flag associated with the current video block.

3. The method of claim 1, wherein the second piece of information includes the actual value of the parameter.

4. The method of claim 1, wherein at least one of the combining function or the inverse combining function involves an XOR operator.

5. The method of claim 1, wherein decoding the current video block based on the second piece of information comprises performing a motion compensation for the current video block based on the second piece of information.

6. A video decoding device, comprising:
a processor configured to:
obtain a first piece of information from a video bitstream, wherein the first piece of information is associated with a current video block and includes a combination of an actual value of a parameter and a prediction value associated with the first piece of information;
determine the prediction value associated with the first piece of information based on one or more neighboring video blocks of the current video block or based on contextual information associated with the current video block;
perform an inverse combining function on the first piece of information and the prediction value to derive a second piece of information, wherein the inverse combining function is inverse to a combining function used by a video encoding device to combine the actual value of the parameter and the prediction value; and
decode the current video block based on the second piece of information.

7. The video decoding device of claim 6, wherein the first piece of information indicates the value of an illumination compensation flag associated with the current video block.

8. The video decoding device of claim 6, wherein the second piece of information includes the actual value of the parameter.

9. The video decoding device of claim 6, wherein at least one of the combining function or the inverse combining function involves an XOR operator.

10. The video decoding device of claim 6, wherein the processor being configured to decode the current video block based on the second piece of information comprises the processor being configured to perform a motion compensation for the current video block based on the second piece of information.

11. A method of encoding video data, comprising:
obtaining an actual value of a parameter associated with a current video block;
obtaining a prediction value associated with the parameter based on one or more neighboring video blocks of the current video block or based on contextual information associated with the current video block;
combining the actual value of the parameter and the prediction value associated with the parameter into a piece of information that indicates the value of an illumination flag or a motion vector associated with the current video block, wherein the combination is derived by at least applying an XOR operator to the actual value of the parameter and the prediction value; and
encoding the piece of information.

12. A video encoding device, comprising:
a processor configured to:
obtain an actual value of a parameter associated with a current video block;
obtain a prediction value associated with the parameter based on one or more neighboring video blocks of the current video block or based on contextual information associated with the current video block;
combine the actual value of the parameter and the prediction value associated with the parameter into a piece of information that indicates the value of an illumination flag or a motion vector associated with the current video block, wherein the combination is derived by at least applying an XOR operator to the actual value of the parameter and the prediction value; and
encode the piece of information.

* * * * *